United States Patent [19]

Watson, Jr.

[11] 4,050,881
[45] Sept. 27, 1977

[54] REMOTE HEATING PROCESS

[75] Inventor: James J. Watson, Jr., McMinnville, Tenn.

[73] Assignee: Carrier Corporation, Syracuse, N.Y.

[21] Appl. No.: 672,199

[22] Filed: Mar. 31, 1976

[51] Int. Cl.$^2$ .......................... F27D 13/00; F27B 3/22
[52] U.S. Cl. ..................................... 432/5; 113/1 C; 165/151; 432/22
[58] Field of Search .......................... 432/1, 3, 5, 6, 22, 432/225, 226; 113/1 C; 148/20.3, 27; 165/151

[56] References Cited
U.S. PATENT DOCUMENTS

| 2,160,633 | 5/1939 | Young | 432/225 |
|---|---|---|---|
| 3,601,878 | 8/1971 | Karmasin | 165/151 |

*Primary Examiner* — John J. Camby
*Attorney, Agent, or Firm* — J. Raymond Curtin; Donald F. Daley

[57] ABSTRACT

A process for heating the tubular joints of a heat exchanger assembly to facilitate the creation of a fluid-tight bond between the tubular elements. The joints are positioned adjacent to one or both of the heat exchanger tube sheets and a jet of flammable gas directed into the joint region generally perpendicular to the plane of the tube sheet. The velocity of the gas stream directed at the sheet is high enough to prevent the gas from mixing with ambient air and thus being ignited. Upon impacting the tube sheet, the gas stream is redirected along the sheet, reducing its speed and mixing the gas with surrounding air. A combustible blanket is thus established about the tube joints which is ignited to produce controlled heating thereof.

8 Claims, 3 Drawing Figures

REMOTE HEATING PROCESS

BACKGROUND OF THE INVENTION

This invention relates to the fabrication of a heat exchanger coil and, in particular, to a method of heating the tubular joints of the coil during fabrication.

More specifically, this invention relates to the fabrication of a heat exchanger coil for use in a refrigeration system; the coil having complex refrigerant flow circuitry contained therein.

The term coil, as herein used, refers generally to a heat exchanger having a series of parallel rows of tubes running transversely through a fin package made up of spaced apart planar heat transfer surfaces. Refrigerant is circulated through the tube rows while ambient air is directed over the heat exchanger fins by means of a fan or the like.

In a complex coil of this nature, the parallel rows of tubes are interconnected by means of return bends and crossover tubes to form a number of refrigerant flow circuits that are strategically positioned within the fin package. By selectively controlling the operation of the circuits, the capacity of the heat exchanger can be varied in response to the load demands placed upon the air conditioning system.

Typically, the tube rows making up the various circuits are tightly spaced within the fin package. As a consequence, the components interconnecting the rows to form the various circuits, as well as those components needed to bring refrigerant into and out of the circuits, are tightly packed within a very confined area. Often times, the tubular connections are required to pass one over the other. Proper heating of the connector joints during the formation of the coil assembly has long been a problem in the art because of the close compactness of the components within the joint region. As can be seen, the tightly spaced tubular components serve to shield one another from most conventional heat sources, such as spear flame guns or radiant heat lamps. Furthermore, the shadowing components, because they lie closer to the heat source than the joint to be treated, are in constant danger of being overheated and thus thermally damaged.

SUMMARY OF THE INVENTION

It is therefore an object of the present invention to better facilitate the assembly of a heat exchanger coil.

A further object of the present invention is to overcome the shadowing effect when heating the tube joints of a heat exchanger coil.

Yet another object of the present invention is to provide uniform and controlled heating of the tube joints of a heat exchanger coil during the bonding thereof.

These and other objects of the present invention are attained by joining the tubular components of a coil assembly within a region adjacent to one or both of the fan coil tube sheets, directing a high speed jet of flammable gas at the tube sheet whereby the gas flow is redirected and retarded to form a blanket of gas about the tube joints, maintaining the jet speed at a velocity so as to prevent the gas from being ignited as it travels from its source to the tube sheet, and igniting the gas within the blanket to create a controlled burning of the gas about the tube joints.

BRIEF DESCRIPTION OF THE DRAWINGS

For a better understanding of the present invention, as well as other objects and further features thereof, reference is had to the following detailed description of the invention to be read in conjunction with the accompanying drawings, wherein.

DESCRIPTION OF THE PREFERRED EMBODIMENT

Figure 1:
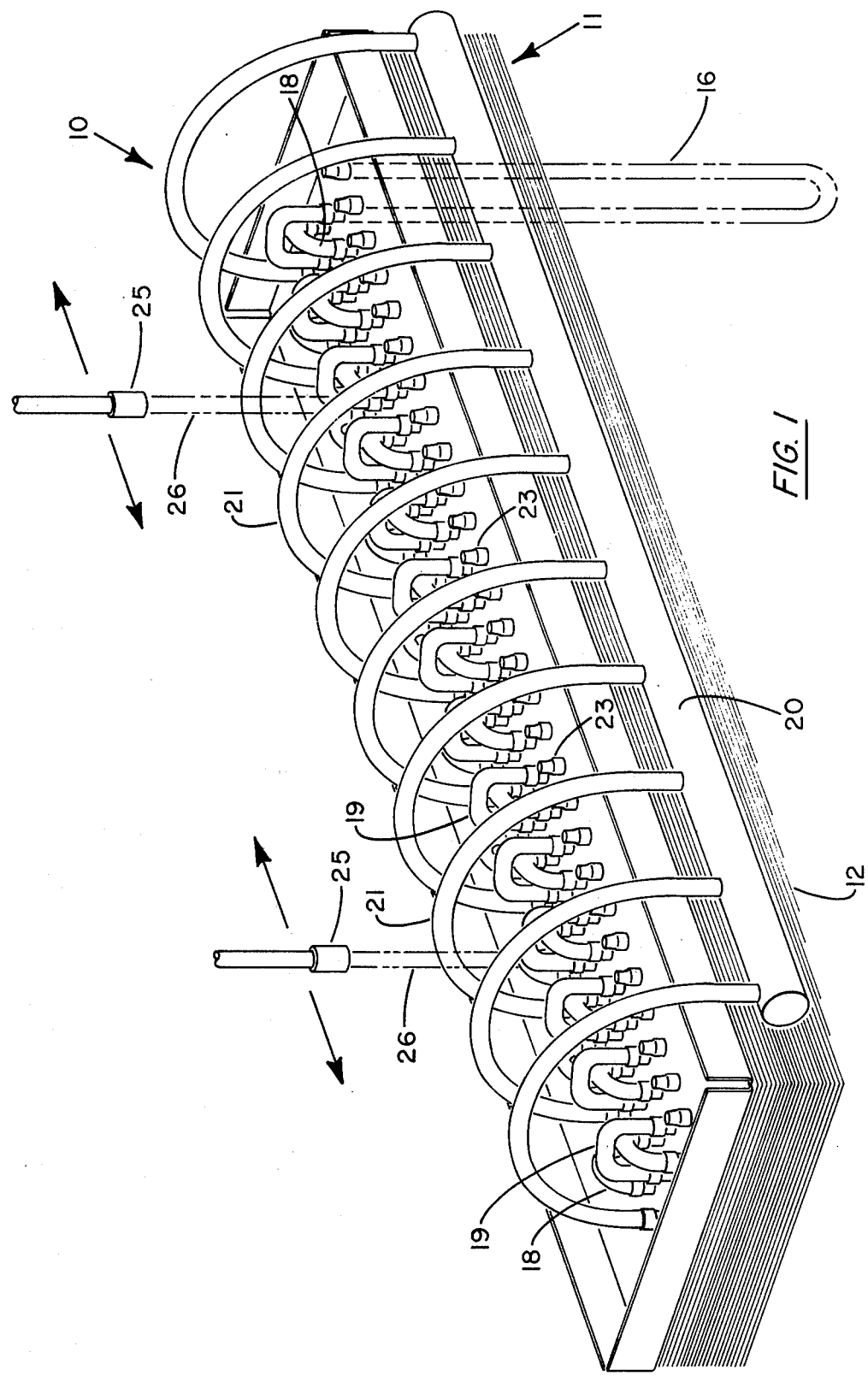
FIG. 1 is a fragmented perspective view of a heat exchanger coil having a number of parallel rows of tubes being interrelated by connectors so as to establish a plurality of complex flow circuits therein.
Figure 2:
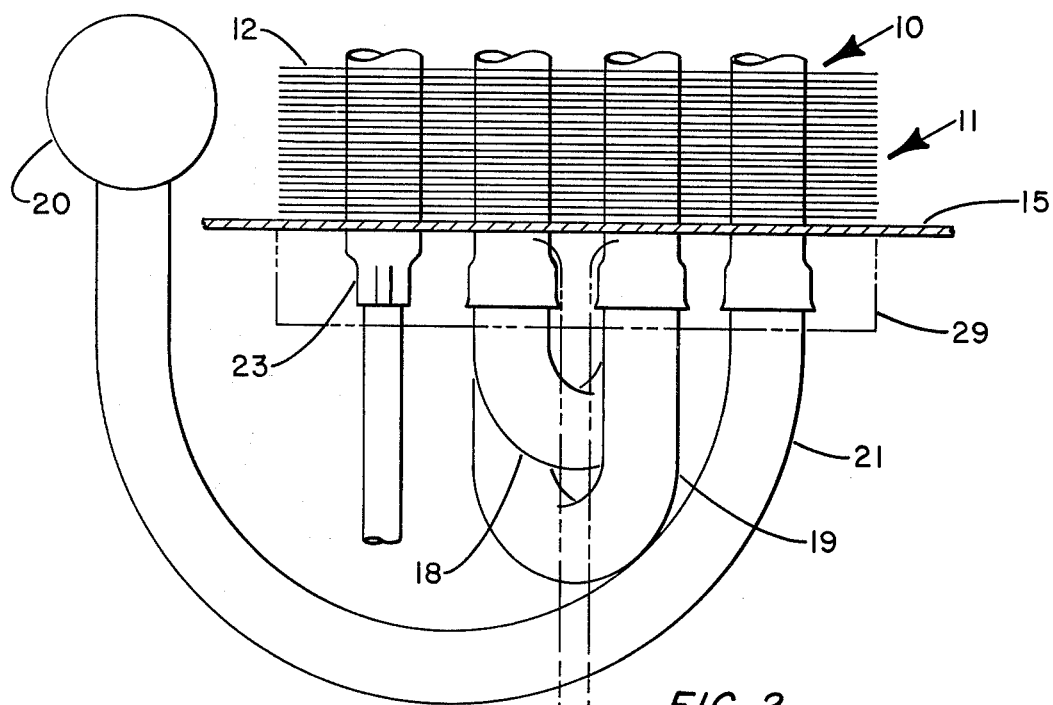
FIG. 2 is an end view of a complex coil, similar to that illustrated in FIG. 1, showing the extablished of a burning zone within the tube joint region utilizing the remote heating process of the present invention.

Referring first to FIGS. 1 and 2, there is illustrated a typical heat exchanger coil 10, having a number of complex flow circuits passing therethrough. The heat exchanger is formed of a fin package 11 having a plurality of parallel tube rows passing transversely through the structure. As best seen in FIG. 1, it is the general practice to form two adjacent tube rows from a single U-shaped tubular element 16. The U-shaped elements, generally called hairpins, are passed through the fin package and the open ends connected by return bends 18 and/or crossover tubes 19 to form flow circuits, each of which makes several passes through the evaporator assembly, thus enabling the working fluid to exchange a significant amount of energy with a heat transfer medium forced over the surface of the fin array.

In the refrigeration art, the exchanger is generally utilized to either discharge or acquire energy from air forced across the fins by a fan or the like. It is conventional to run the flow circuits across the full length of the assembly transverse to the direction of air flow with the circuits often times being interwoven together for maximum exchanger efficiency. Refrigerant is delivered into the exchanger from a series of distributors or the like (not shown) via inlet ports 23, passes through the various circuits and is then discharged into a central header 20 by means of header tubes 21.

The fin package 11 consists of a series of generally rectangular sheets 12 of thin gauge material, such as aluminum, having good heat transfer characteristics. The sheets are arranged in a stack-like configuration in spaced apart alignment between two relatively stiff end plates commonly referred to as tube sheets to provide a relatively rigid, free-standing structure. Tube receiving apertures are passed through the fin package, including the tube sheets, into which the hairpin elements 16 are inserted. A slight interference fit is provided between the fins and the hairpins whereby the tubes provide further structural strength to the assembly and the heat transfer properties of the coil are also enhanced.

In assembly, the free ends of the hairpins are brought out beyond one or both tube sheets, as for example tube sheet 15 shown in FIGS. 1 and 2, and the free ends thereof belled out to receive a telescoped relationship therewith the various connector components which complete the various flow circuits. These connectors include, but are not limited to, return bends 18, crossover tubes 19, and header tubes 21, as illustrated in the drawings. The joint between the hairpins and the connectors is closed to create a high strength fluidtight bond between the elements.

Typically, the bond is formed by introducing a filler metal, such as a brazing or soldering compound, into the bell region and creating a metallurgical bond between the elements by the application of heat to the joint region. Because of the economics involved, recent efforts have been directed toward fabricating all the tubular elements of a heat exchanger coil of aluminum. However, formation of reliable joints between aluminum tubes has proven to be difficult because most fluxes that are commercially available tend to create oxides within the joint region thus making the joints suscepible to corrosion. Two processes have been developed which eliminate the need to use a flux when forming an aluminum joint. These include an ultrasonic dip process, as disclosed by Greever in U.S. Pat. No. 3,760,481, and a forced fit process, as disclosed in U.S. Pat. No. 3,633,266. It should be noted that in both of these processes, accurately controlled heating or preheting of the joint region is necessary in order to create a reliable bond. As pointed out above, and as should be apparent from the present drawings, in the case of a complex coil as herein described, a relatively large number of connecting elements are brought together within a very limited area, making complete and regulated heating and/or preheating of the joints extremely difficult, particularly when employing conventional heat sources, such as radiant lamps or spear flame guns.

In practice, the tightly packed tubular components shadow or shield each other from conventional heat sources. The effect of shadowing is herein overcome by a heating process wherein energy is introduced into the joint region in the form of unignited, flammable gases using a remote nozzle or nozzles 25. The nozzle is trained at the surface of the tube sheet 15 which, as described above, is located adjacent to the bell joint region. A jet or stream 26 of flammable gas, such as natural gas, propane, or the like, is issued from the nozzle at a relatively high speed. The gas stream is maintained at a velocity high enough to prevent the gas from mixing with ambient air as it move from the nozzle to the tube sheet which, in effect, precludes the stream from being ignited prior to its impacting the tube sheet.

Upon striking the tube sheet, the gas flow is turned or flattened out to follow the planar contour of the sheet. Turning the gas stream causes the flow rate to be rapidly decelerated and the gas to be mixed with ambient air under turbulent conditions. As a consequence, a blanket of highly combustible material is established adjacent to the tube sheet; the blanket enveloping the tube joint region. In practice, the planar tube sheet performs a gas holding function quite similar to that observed when a jet of water is impinged against a pane of flat glass. Rather than rebounding away from the planar surface at impact, the fluid moves out along the planar surface in close proximity therewith to form a finite zone at or about the planar surface.

Once established, the blanket of gas in the joint region is ignited to form a burning zone 29 of finite geometry which will continue to burn as long as the high velocity jet of gas is directed at the tube sheet. It has been found that the geometry and the temperature of the burning zone can be closely regulated by controlling either the jet impact angle, the distance of travel between the nozzle and the tube sheet, the jet velocity and/or the quantity of gas directed into the burning zone. In operation, it is preferable to maintain the height of the burning zone, in reference to the plane of the tube sheet, just above the tubular joints thereby minimizing the possibility of causing thermal damage to adjacent coil components. The height of the burning zone can be most conveniently regulated by controlling the velocity of the gas jet directed at the tube sheet.

It should be further noted that the gas stream directed at the tube sheet has the ability to conveniently flow about or around the tubular connectors without disturbing the operation of the heating process. The characteristic of most gases coupled with the generally streamline configuration of the tubular components serves to minimize drag and thus permits the gas to flow relatively freely into the burning zone. In operation, a series of nozzles, such as the nozzles shown in FIG. 1, can be moved back and forth over the joint region to establish and maintain an elongated burning zone encompassing the entire joint region of the heat exchanger.

Figure 3:
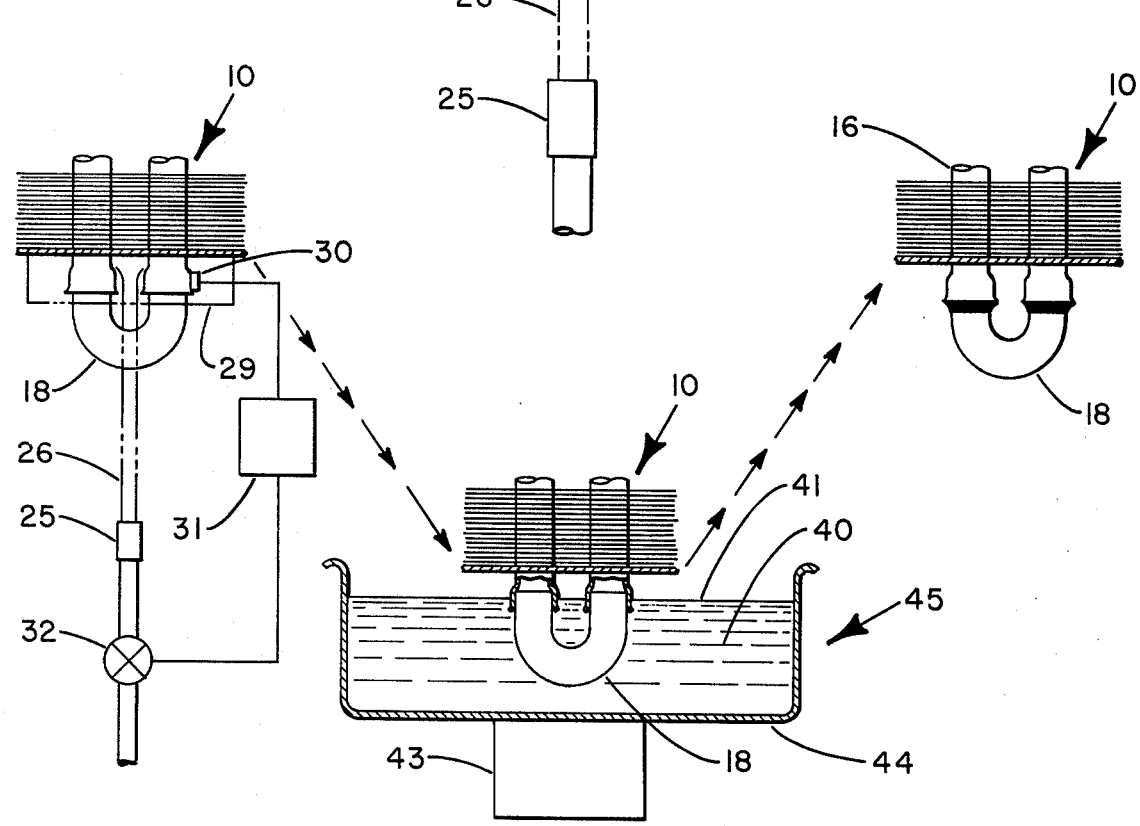
FIG. 3 is a diagrammatic goal illustration of a process for joining the tubular connections of a coil assembly utiliziang the remote heating process of the present invention.

Referring now to FIG. 3, there is illustrated an ultrasonic dip process for soldering connector joints which employs the teachings of the present invention. As disclosed in the previously noted Greever patent, the soldering process basically involves immersing the joints into a molten bath of solder and treating the bath to ultrasonic energy. Because the fan coil is designed as a good heat exchanger, drainage of heat out of the joint area during this soldering process can take place at a relatively rapid rate. In order to establish a truly reliable joint, it has been found advantageous to preheat the coil prior to dipping it into the solder bath. By preheating the coil, the coil structure will act as a controlled heat sink when the joints are immersed within the ultrasonic bath thus insuring that the temperature in the joint region does not fall below the critical soldering temperature.

As illustrated in FIG. 3, the remote heating process previously described is utilized to accomplish the preheating step. As seen, the nozzle 25 is directed at the tube sheet 15 of a heat exchanger coil 10 in process. As a result, a burning zone 29 is established about the joint region. To control the preheating step, a thermal probe 30 is placed against the bell joint within the burning zone. The thermal coupling is arranged to send a temperature indicative signal to a regulator 31 which controls the flow of gas to a nozzle via automatic control valve 32.

When the desired preheating temperature is reached, the flow of gas is terminated and the probe removed from the bell joint region. The heat exchanger coil is then rapidly moved into a molten solder bath 40 with the bell joints being immersed below the surface 41 thereof to a predetermined, controlled depth. The immersed joints are allowed to remain in the bath for a dwell period so that thermal equilibrium is reached. A transducer 43, located along the bottom wall 44 of the bath tank 45, is actuated which subjects the solder to ultransonic energy which, in turn, is imparted to the joint region. This energy serves to remove unwanted oxides from the bell joint region. Upon completion of the soldering step, the fan coil is removed from the bath and the now bonded joints allowed to air cool and solidify.

While this invention has been described with reference to the structure herein disclosed, it is not confined to the details as set forth, and this application is intended to cover any modifications or changes as may come within the scope of the following claims.

What is claimed is:

1. In the fabrication of a heat exchanger wherein tubular components are bonded together to form flow circuits through the heat exchanger coil, the process of heating the tubular joints of the exchanger during the bonding operation, including the steps of assembling the tubular components with their joints being located in a region adjacent to at least one tube sheet of the heat exchanger coil, directing a high speed jet of flammable gas at the tube sheet adjacent to the joint region whereby, upon striking the tube sheet, the gas forms a blanket of flammable gas about the tubular joints, maintaining the velocity of the jet traveling between the jet source and the tube sheet at a speed sufficiently high enough to prevent the gas in the jet stream from mixing with ambient air and thus being ignited, and igniting the gas within the blanket to create a burning zone encompassing the tube joint region whereby the joints are heated to a predetermined temperature.

2. The method of claim 1 further including the step of moving the source of the jet over the tube sheet to establish an elongated blanket of gas within the joint region.

3. The process of claim 1 wherein a plurality of jets are directed at the tube sheet.

4. The process of claim 1 wherein the temperature within the blanket and geometry of the blanket are controlled by regulating the angle of impact of the gas jet directed against the tube sheet.

5. The process of claim 1 wherein the temperature within the blanket and the geometry of the blanket are controlled by regulating the quantity of gas directed into the blanket.

6. The process of claim 1 wherein the temperature within the blanket and the geometry of the blanket are controlled by regulating the distance between the jet source and the tube sheet.

7. The process of claim 1 wherein the temperature within the blanket and the geometry of the blanket are controlled by regulating the velocity of the jet directed at the tube sheet.

8. The process of claim 1 further including the steps of sensing the temperature of the ignited gas within the blanket, and regulating the flow of gas into the blanket in response to the temperature sensed.

* * * * *